United States Patent

Cupler, II

[15] 3,679,273
[45] July 25, 1972

[54] ADJUSTABLE VEE BEARING

[72] Inventor: John A. Cupler, II, 10 Cupler Drive-LaNale, Cumberland, Md. 21502

[22] Filed: May 5, 1970

[21] Appl. No.: 34,787

[52] U.S. Cl..................................308/36, 308/63, 308/73
[51] Int. Cl. .....................................F16c 23/02, F16c 29/10
[58] Field of Search..................308/36, 37, 63, 73, 3 R, 3 A; 77/5; 151/24

[56] References Cited

UNITED STATES PATENTS

| | | | |
|---|---|---|---|
| 3,472,704 | 10/1969 | Watson et al. | 308/241 |
| 2,812,221 | 11/1957 | Cupler | 308/2 |
| 2,886,088 | 5/1959 | Brancato | 151/24 |
| 2,448,341 | 8/1948 | Yeomans | 308/37 |
| 3,106,117 | 10/1963 | Duquesnel | 308/3 A |
| 3,537,762 | 11/1970 | Lodige | 308/3 R |
| 99,315 | 2/1870 | Heermance | 151/24 |
| 936,549 | 10/1909 | Lundholm | 151/24 |
| 1,111,732 | 9/1914 | Breault | 151/24 |
| 1,324,061 | 12/1919 | Nelson | 151/24 |
| 2,616,475 | 11/1952 | Koza | 151/24 |

OTHER PUBLICATIONS

Product Engineering, V24, N8, Aug. 1953, P. 186- 191. " Jewel Bearings", Cameron, Jr.

Primary Examiner—Martin P. Schwadron
Assistant Examiner—B. G. Rossman
Attorney—Colton & Stone

[57] ABSTRACT

An adjustable Vee bearing wherein a bearing defined axis may be adjusted within the bearing itself.

10 Claims, 5 Drawing Figures

PATENTED JUL 25 1972 3,679,273
FIG. 1
FIG. 2
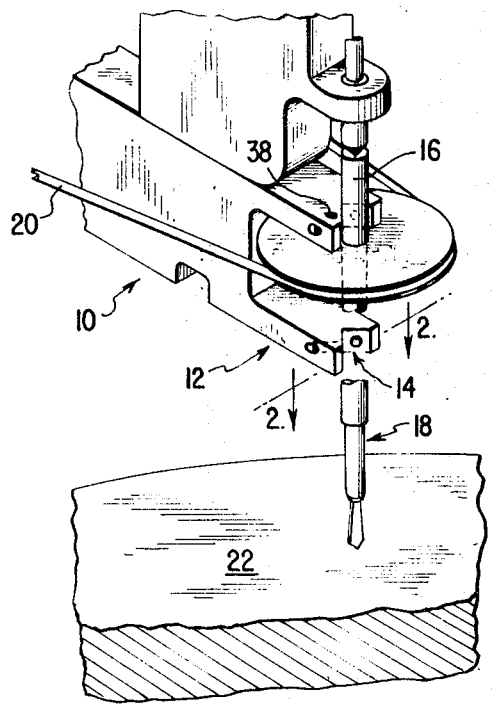
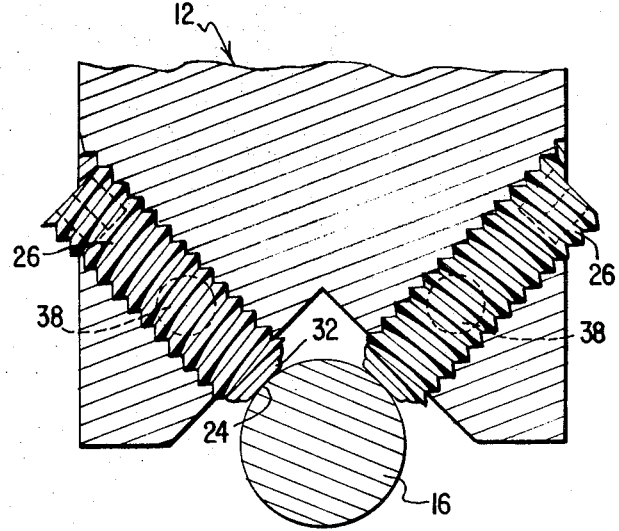
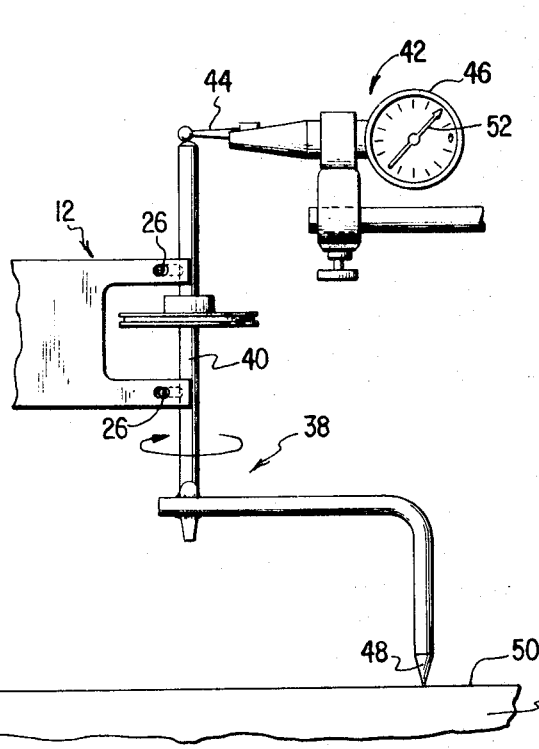
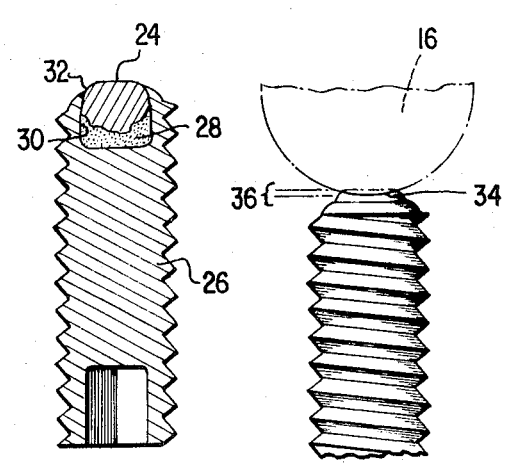
FIG. 3
FIG. 4
FIG. 5
INVENTOR
JOHN A. CUPLER, II
BY Colton + Stone
ATTORNEYS

ADJUSTABLE VEE BEARING

BACKGROUND OF THE INVENTION

Conventional Vee bearings, by definition, provide spaced pairs of line contact bearings against which a semi-cylindrical area of the cylindrical surface or surfaces of a workpiece or tool is biased for rotation and/or reciprocating infeeding motion relative thereto. The pair spacing is along the axis of the workpiece or tool and the line contact bearings of each pair are spaced less than 180° about the cylindrical surface of the workpiece or tool which will be biased thereagainst, i.e. each pair bears against the same semi-cylindrical surface area of the journalled cylindrical surface. Accordingly, rotation or reciprocation of the workpiece or tool will necessarily occur about or along an axis concentric with the cylindrical surface subject only to the requirement that the cylindrical surface be maintained in constant engagement with the line contact bearings. The universally recognized advantage in the use of Vee bearings is that they are a fixed part of a static machining support and will always define precisely the same axis for a tool or workpiece having a common diameter thus eliminating the introduction of those positioning errors which are necessarily associated with the chucking and unchucking of tools or workpieces. A more complete description of the advantages inherent in the use of Vee bearings via-a-vis conventional chucks may be found in U.S. Pat. No. 3,478,419.

As will be readily understood from a perusal of the aforementioned patent it is virtually impossible to introduce any positioning error into a Vee bearing support except for that which may gradually occur over a long period of time as the bearings wear. An early attempt to combat this problem is disclosed in U.S. Pat. No. 2,812,221 wherein jewel inserts are provided in the line contact area. Inasmuch as diamonds cannot be practically shaped in the manner proposed in the last mentioned patent, the use of those jewel inserts, such as sapphires, represented nothing more than a prolongation of that period during which a particular Vee bearing could be used before it must be discarded. It is not a sufficient answer that a journalled workpiece or tool may only wear a slight indentation in a jewel insert because, in the small and microscopic world of precision microdrilling and machining such as in the range below 0.0000050 inch; any change, however slight, in the line contact is magnified through the lever arm represented by the workpiece or tool and though such change would probably never be visible to the naked eye it cannot be tolerated in precision microdrilling or machining of the type herein contemplated. Additionally, the flush relationship of the jewels relative to their mounting pedestals as shown in U.S. Pat. No. 2,812,221 causes the tool spindle to engage the pedestal as soon as the inserts start to wear. Even if diamonds could be shaped in such a manner as that specifically proposed in the aforesaid patent the accuracy of a machining operation would still be totally dependent upon the relative positioning of the tool and workpiece which represents an area of precision adjustment which has never been attempted via the bearings themselves. Stated differently, it has always been assumed that the ultimate in precision machining could be achieved by the provision of a fixed tool or workpiece axis which always defines precisely the same centerline subject only to the requirement of a uniformity of interchanged tool or workpiece diameter. This is the known advantage of Vee bearings as contrasted with chucks. Even, however, when a perfectly reproducible centerline is assured, for either the tool or workpiece; this can give no assurance that the relative angular relationship between the tool and workpiece are of a desired value. Stated differently, the use of Vee bearings will insure that more than one tool or workpiece will assume the same centerline relative to the other but they will not, for example, insure that the tool centerline is precisely perpendicular to a flat workpiece surface; rather, the Vee bearings will only insure that if the first tool is not perpendicularly related to the workpiece the next interchanged tool will be similarly out of perpendicular relationship. Thus, conventionally, it is necessary to attempt to achieve desired relative relationship of parts by the relatively coarse positioning which may be achieved by movement of a fixed support relative to the Vee bearings. Again, in any but the microscopic world, the usual precision adjusting methods would be more than satisfactory; however backlash alone, even in a finely threaded screw used to reposition relatively massive equipment, introduces totally unacceptable errors in many types of microdrilling operations.

SUMMARY OF THE INVENTION

The invention is directed to a new concept in tool and workpiece positionment; that of the adjustable Vee bearing. Coarse adjustments of the relative positions of a tool and workpiece may be made in a conventional manner and, thereafter, an adjustment of the tool working end, for example, may be effected within the bearing itself without the introduction of backlash because of the extremely slight mass of the tool. Although closely related to the aforesaid relative positionment concept, a totally distinct purpose is to compensate for wear in a jewel bearing, other than a diamond, to again achieve the precise centerline which was initially defined by the unworn bearing inserts.

The invention further contemplates a manner in which diamond inserts may be practically used as the jewel insert and such inserts do not, of course, ever require repositioning to compensate for wear since diamonds are not subject to wear by their bearing engagement with a tool or workpiece.

Basically, the invention contemplates the use of jewels, preferably diamonds, wherein one surface of each jewel has been lapped perfectly flat and fitted within the counterbored end of a finely pitched set screw and wherein the lapped surface protrudes beyond and is perpendicular to the axis of the set screw. Four of these set screws are then threaded into correspondingly threaded openings in a support structure to provide spaced pairs of line contact bearings whereupon an adjustable Vee bearing is defined. The calibration or positioning of the set screws to achieve a perfect relationship of the tool relative to a workpiece may then be carried out in a conventional manner and the jewel bearing set screws locked in place by an appropriate adhesive in the case of diamond inserts where further adjustment will never be required or by intersecting set screws in the case of other jewel inserts which must occasionally be readjusted to compensate for wear.

Although the following description relates to a tool which is mounted for both rotation and reciprocation within the bearing; it is apparent that tools or workpieces having other cross-sectional shapes, such as triangular for example, may be non-rotatably supported on the bearing for reciprocal movement.

DESCRIPTION OF THE DRAWING

FIG. 1 is a fragmentary perspective view of a typical microdrill mounted for rotation and reciprocation in an adjustable Vee bearing;

FIG. 2 is a sectional view taken along line 2—2 of FIG. 1;

FIG. 3 is a longitudinal sectional view of one adjustable bearing element;

FIG. 4 is an illustrative showing of the manner in which jewel inserts, other than diamonds, may become worn; and FIG. 5 is a broken elevational view of apparatus employed in the adjustment of the plural bearing elements comprising the adjustable Vee bearing.

DESCRIPTION OF THE PREFERRED EMBODIMENT

In FIG. 1 is fragmentarily illustrated a typical Vee type drilling machine 10 employing a jeweled Vee bearing 12 defined by two pairs of spaced jewels 14 against which is biased the spindle 16 of drill 18 by a driven flexible belt 20. Drill 18 is illustrated in position to machine a workpiece 22. In FIG. 2 is illustrated the line contact between the flat surfaces 24 of one pair of jewel inserts 14 and the circumference of spindle 16. Each jewel is lapped until surface 24 is perfectly flat and is then mounted in the counterbored end of set screw 26 with the flat surface perpendicular to the axis of the set screw. Any desired conventional mounting arrangement may be utilized to fix the jewel within the counterbored set screw, the arrangement shown utilizing adhesive composition 28 in conjunction with a staking over of the upper end of counterbored wall 30 onto a peripheral radiused portion 32 of the jewel. Conventional jewelry soldering may also be used, if desired. Assuming, first, the use of jewel inserts other than diamonds such as sapphires, for example. Over a period of time flat surface 24 will be worn away and an indentation 34 will appear in all four of the inserts so that the centerline of the tool will have shifted as the transition from a line contact bearing to a surface contact bearing occurs concomitant with the formation of the indentations. FIG. 4 illustrates this wear pattern wherein it may be seen that a spindle 16 was initially in line bearing contact with flat surface 24 of the insert and, thereafter, assumed a surface bearing contact with indentation 34 with the shift of centerline being equal to the distance 36, assuming that all inserts wear equally. Although the transition from line to surface contact at the bearing surfaces can be tolerated, the shift of centerline cannot. Accordingly, at this point in time, locking set screws 38 are backed off and set screws 26 are advanced until the indented surfaces again define the previous centerline. The manner in which this calibration may be effected is the same as that which will be described below in connection with the initial precise positionment of diamond inserts.

In the case of a diamond insert, no wear will occur and the flat surfaces 24 will, forever, define an axis of tool rotation by line, as opposed to surface, contact bearings. Nevertheless, it is necessary to initially insure that the tool assumes the precise desired relationship to a workpiece 22. Assuming that it is desired to position the tool at a precise right angle to the workpiece; it is self evident that, in the construction of the machine and its work support table, an effort will have been made to achieve this result however because of the relatively large masses involved this is seldom achieved with absolute precision. The invention makes it possible to achieve this result by an adjustment within the bearing itself where only very small masses (the set screw and tool) are involved.

One conventional method of determining whether a tool is perpendicular to a workpiece is illustrated in FIG. 5 wherein a gauging scribe 38 including a dummy spindle 40 having the same diameter as that of a tool to be supported in the Vee bearing 12 is supported in the bearings by a flexible drive belt (not shown). After placing the gauging scribe in the bearings, a conventional feeler gauge 42 such as that manufactured by the L. S. Starrett Company, Athol, Massachusetts under model designation 711-F is fixedly positioned in any desired manner with the infeed arm 44 in light contact with the upper end of dummy spindle 40 to give a reading on indicator 46 other than zero while scribe point 48 is in light contact with flat surface 50 of workpiece 22. As the dummy spindle 40 is slowly rotated, any variation between the axis defined by Vee bearing 12 and a perpendicular to workpiece surface 50 will, of course, be reflected on indicator 46 as the pressure contact with scribe point 48 varies during its 360° rotation. As the scribe point is slowly rotated and a discrepancy is noted, set screws 26 are adjusted in or out until a complete 360° rotation of the scribe point does not deflect indicator pointer 52 at which time the tool has been adjusted to be perfectly perpendicular to the work surface and set screws 26 may be locked in place and, in the case of diamond inserts, they will never again require further adjustment.

I claim:

1. An adjustable Vee bearing, comprising; spaced pairs of discrete bearing elements presenting flat bearing surfaces diverging in a common direction from a common axis defining an open bearing for simultaneous bearing contact with the same semi-cylindrical surface area of a rotating cylindrical part to define a rotational axis therefor, and means for moving selected ones of said bearing elements toward and away from said axis to define different rotational axes for said rotating part.

2. The bearing of claim 1 wherein said discrete bearing elements include jewels.

3. The bearing of claim 2 wherein said jewels are diamonds.

4. The bearing of claim 1 wherein said means include threaded elements.

5. The bearing of claim 4 wherein said bearing elements comprise jewels and said jewels are fixedly mounted to said threaded elements.

6. The bearing of claim 5 wherein the threaded elements and jewels are mounted for adjustment within a fixed support structure, and means for locking said threaded elements relative to said support structure.

7. The bearing of claim 6 wherein said last named means includes threaded elements threadedly received within said support structure for axial locking movement along a path intersecting said first named threaded elements.

8. The bearing of claim 1 wherein said means include threaded elements, said bearing elements comprise jewels and said jewels are fixedly mounted to said threaded elements and project beyond the ends thereof.

9. The bearing of claim 8 wherein the projecting portion of the jewels comprises a central section providing the flat bearing surface and a peripheral section defining an acute angle to the central section.

10. The bearing of claim 8 wherein said threaded elements are arranged to move said jewels along an axis intersecting the first named rotational axis.

* * * * *